3,749,773
GELLED STEROID OINTMENT
Fred C. Ninger, Morristown, and Martin L. Eichman, Mendham, N.J., assignors to Warner-Lambert Company, Morris Plains, N.J.
No Drawing. Filed Feb. 25, 1971, Ser. No. 118,970
Int. Cl. A61k *17/00, 27/10;* A61l *23/00*
U.S. Cl. 424—81                                          3 Claims

ABSTRACT OF THE DISCLOSURE

The present invention relates to a topical ointment base especially suited to the incorporation of a suitable steroid. The ointment base of the present invention is a mixture of ethanol, propylene glycol and water having a topically active amount of betamethasone 17-benzoate dissolved therein and gelled with a neutralized carboxy vinyl polymer.

---

It is an object of the present invention to provide an ointment base in which the ordinarily difficult to incorporate steroid is dissolved. The steroid, betamethasone 17-benzoate, is described in U.S. Pat. 3,529,060 to Ercoli et al., which issued Sept. 15, 1970, wherein its preparation, properties and several formulations embodying it are described.

It is another object to provide a steroid in a topical base which is cosmetically elegant.

A further object is to provide steroid ointment base from which the active component is quickly and efficiently supplied to the skin.

Another object of the present invention is to provide a steroid ointment base which is durable and resistant to being removed by the rubbing of clothing.

These and other objects of the present invention will be more fully understood in light of the specific examples and description set forth hereinafter.

The use of topical ointments as vehicles for steroids having inflammatory activity is well-known as exemplified in the patent of Ercoli et al. The problem which must be dealt with in order to prepare a successful composition is to balance the completeness of incorporation of the steroid in the vehicle, in this case an ointment with the ease and completeness of its release from the ointment to and through the skin to which it is applied.

The use of topically active steroids including betamethasone 17-benzoate to treat dermatological conditions such as dermatitis, eczema, inflammation and the like.

The ointment base can contain betamethasone 17-benzoate in amounts by weight of from 0.0005 to 5% but ranges of 0.005 to 0.5% have been found particularly suitable.

Topical steroids dispersed or incorporated in oil-in-water or water-in-oil systems have been observed to remain unabsorbed by the skin because they are insoluble in these systems. On the other hand, when a water soluble steroid is used which does dissolve in the aqueous phase of either the oil-in-water or water-in-oil system, then when the steroid is exposed to dermal surface, it is too water soluble for optimal absorption.

An ideal way to effect solubility with good absorption would be to completely dissolve the steroid in a pharmaceutical dosage form, but the steroid should have optimal lipophilic/lipophobic ratio for optimal dermal absorption. At present, attempts to achieve this optimal lipophilic/lipophobic balance utilize the micronization of the water insoluble steroid prior to or after incorporation into the oil-in-water or water-in-oil emulsified system. Another way to achieve this ratio for water insoluble steroids comprises dissolving or dispersing the steroid in propylene glycol. Such a system is, of course, in the form of a fluid and presents many problems when it is applied to the dermal surface.

Topical preparations containing steroids dispersed or incorporated in oil-in-water or water-in-oil systems have traditionally been used medicinally. These preparations have been formulated more on the basis of their cosmetic appeal than on their medicinal efficacy. In these preparations the steroid may be poorly absorbed due to its insolubility in the vehicle or where soluble, due to retention by the vehicle rather than by its release to the surface of the skin. Additionally, these preparations have the disadvantage of leaving a greasy residue on the skin's surface. An ideal way to effect good absorption would be to dissolve the steroid in the pharmaceutical dosage form. In this dosage form, however, the steroid must have optimum lipophilic/lipophobic properties for optimum dermal absorption.

Other attempts to solve these problems have not been satisfactory. For example, U.S. Pat. No. 3,352,753 describes the preparation of steroids in gelled alcohol. This generally results in the formation of a solid composition, but such a preparation suffers from a distinct disadvantage in that it is not readily spreadable on the skin. From a cosmetic point of view, the application of such a preparation results in the formation of a greasy film which not only attracts foreign particles but also is not at all appealing.

It has now been found that an unexpectedly durable base can be formed by gelling a mixture of ethanol and propylene glycol and water which has been gelled by the use of an acidic carboxy polymer such as one available under the trade name Carbopol 940 which is made neutral by mixing it with an organic amine.

The gels of the present invention can be made clear and transparent when the steroid goes into solution in the ethanol-propylene glycol phase of the gel and remains in solution with the amount of water present in the preferred embodiments. The steroid is directly available to the skin to which it is applied in the alcohol phase of the gel which is held in the matrix formed by the neutralized carboxy vinyl polymer. Applied to the skin a nearly invisible layer is formed which is very adherent, the upper surface dries on exposure to the air and a durable, abrasion-resistant film forms. The steroid ointment remains intact under ordinary conditions for the major portion of the available steroid to be absorbed through the skin.

An additional property of the ointment bases of the present invention is that they possess anti-bacterial activity. Cultures of *S. choleraesuis, Ps. aeruginosa, B. cereus* and *A. flavus* inoculated into the ointment base of Example I in concentrations of $5 \times 10^5$ microorganisms per gram of product were determined to have a survival rate of less than 1% after being in contact with the base for twenty-four hours.

The following examples are set forth in order to further illustrate the invention:

EXAMPLE I

|  | G. |
|---|---|
| (1) Carbopol 940 | 17.5 |
| (2) Propylene glycol | 350 |
| (3) Ethanol USP | 150 |
| (4) Diisopropanolamine | 2 |
| (5) Water, purified USP q.s. to 1000 g. | |

(A) Mix (2) and (3) thoroughly.
(B) Add (A) to 468 g. of water.
(C) Add Carbopol to (B) and mix until it is completely hydrated.
(D) Dissolve the amine in 10 g. of water. Add to (C) with mixing. Bring to final weight with water and give the composition a final mixing.

The gel thus formed is clear, transparent and easily applied to the skin. The base upon application to the skin forms a smooth, dry film on its exposed surface while presenting its gelled alcohol to the skin at the interface.

The active steroid might be incorporated into the gel thus formed but this would not be preferred to adding the steroid during the preparation of the gel composition to insure complete solution and uniformity of distribution of the steroid bearing alcohol solution.

The following example includes as the steroid, betamethasone 17-benzoate and disodium edetate as a stabilizer for the carboxy vinyl polymer gelling agent.

EXAMPLE II

|  | G. |
|---|---|
| (1) Betamethasone 17-benzoate | [1] 0.2625 |
| (2) Carbopol 940 | 17.50 |
| (3) Disodium edetate USP | 1.00 |
| (4) Propylene glycol USP | 350.00 |
| (5) Alcohol USP | 150.00 |
| (6) Diisopropanolamine | 2.00 |
| (7) Water, purified USP to q.s. to 1000 g. | |

[1] 5% excess added to account for processing and analytical losses.

Method of preparation (A) Dissolve (1) in (5). Add (4) and mix thoroughly.
(B) Add (A) to 468 g. of (7). Mix.
(C) Dry mix (2) and (3) and add to (B) while mixing with Hochmeyer Mixer. Mix until (2) is completely hydrated.
(D) Dissolve (6) in 10 g. of (7) and add to (C) with mixing. Bring to final weight with (7). Pass once through Versator.

The amounts of components of the composition may vary considerably without loss of its desirable properties. The preferred embodiment, however, is particularly suited for use with this steroid as a topical ointment base. It has already been shown that the steroid readily goes into solution in the ethanol-propylene glycol mixture which can then be gelled to form an ointment using neutralized carboxy vinyl polymer. Increase in steroid may require increase in amount of total solvent components to prevent crystallization of steroid.

The compositions were varied in terms of their constituents and it was determined that an unexpectedly quick and complete release of steroid from the gel was obtained. This was verified in vitro by dialyzing the gel in a cellophane bag immersed in chloroform and determining the amounts of steroid in the dialyzate at intervals of 3, 6 and 24 hours.

The experimental procedure was as follows: Fifteen grams of gel was introduced into a cellophane dialysis bag which was then tied with a nylon string. The bag containing the gel was submerged in 150 ml. of chloroform maintained at 30° C. The chloroform was stirred continuously with a magnetic stirrer. At specified intervals 15 ml. of chloroform was removed and the volume replaced with fresh chloroform. The sample removed was evaporated and the residue analyzed for steroid.

The gel compositions are listed below:

|  | Percent |
|---|---|
| Betamethasone 17-benzoate | 0.025 |
| Carbopol 940 | 1.75 |
| Disodium edetate | 0.10 |
| Alcohol | 15.00 |
| Diisopropanolamine | 0.20 |
| Propylene glycol, as specified | [1] |
| Water, purified USP, sufficient to make 100%. | |

[1] Propylene glycol levels of 0, 10, 20, 35 and 50% were employed.

Another run was made keeping the propylene glycol constant at 35% and varying the ethanol 5, 10 and 15%. The results were as follows:

TABLE I
[15% alcohol constant]

| | Percent propylene glycol | | | | |
|---|---|---|---|---|---|
| | 0 | 10 | 20 | 35 | 50 |
| Time, hours: | | | | | |
| 3 | 7 | 7.5 | 8 | 48 | 17 |
| 6 | 8 | 11 | 9.5 | 59 | 24 |
| 24 | 9 | 12 | 18 | 79 | 37 |

NOTE.—Values are cumulative amounts of steroid in dialyzate as a percent of steroid present in the base sample.

A second series of steroid ointment bases similar to those upon which Table I is based were prepared with the propylene glycol held constant at 35% by weight and the alcohol varied at 5, 10 and 15% by weight. The results are shown in the following:

TABLE II

| | Percent ethanol | | |
|---|---|---|---|
| | 5 | 10 | 15 |
| Time, hours: | | | |
| 3 | 32 | 39 | 48 |
| 6 | 47 | 58 | 59 |
| 24 | 60 | 67 | 79 |

Another series of measurements were made using a 50% glycol level. The ointments were cosmetically inelegant being somewhat sticky to the touch and rather slow to form any surface protective film to resist their removal by clothing. Measurment of their release of steroid showed decreases with addition of ethanol of 5, 10 and 15%.

It is clear that a combination of about 15% ethanol and 35% propylene glycol provides a completely effective solvent phase in a gel form which the dissolved steroids may be readily absorbed by the skin in major portion of that present in the gel.

The foregoing description is given by way of illustration and not by way of limitation. Many variations may be made in the present invention without departing from the spirit thereof.

Having described our invention, what we desire to secure by Letters Patent is:

1. A gelled steroid containing composition which consists essentially of, by weight, about 15% ethanol, 35% propylene glycol, 0.005 to 0.5% betamethasone 17-benzoate, the balance of the composition being water, the entire composition being gelled by incorporation of about 2% of a carboxy vinyl polymer neutralized with diisopropanolamine.

2. The composition of claim 1 wherein disodium edetate, a stabilizer for the carboxy vinyl polymer, is added in an amount of about 0.2% by weight.

3. The composition of claim 1 wherein the betamethasone 17-benzoate is present in an amount of 0.025% by weight.

References Cited

UNITED STATES PATENTS

| | | | |
|---|---|---|---|
| 3,312,590 | 4/1967 | Elks | 424—243 |
| 3,551,554 | 12/1970 | Herschler | 424—7 |
| 3,627,871 | 12/1971 | Groves | 424—243 |
| 3,011,950 | 12/1961 | Mehaffey | 424—59 |

OTHER REFERENCES

Carbopol, B. F. Goodrich Co., Cleveland, Ohio, Formulary No. 1, 2 pp. rec'd Jan. 11, 1967; Bulletin, Supp. No. 3, July 1959, 3 pp.

Merck Index, Merck & Co., Rahway, N.J. 7th Ed., 1960, p. 863.

ALBERT T. MEYERS, Primary Examiner

A. P. FAGELSON, Assistant Examiner

U.S. Cl. X.R.

424—78, 243